United States Patent
Kimura

(10) Patent No.: US 10,300,819 B2
(45) Date of Patent: *May 28, 2019

(54) VEHICLE SEAT

(71) Applicant: TOYOTA BOSHOKU KABUSHIKI KAISHA, Aichi-ken (JP)

(72) Inventor: Koji Kimura, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/703,383

(22) Filed: Sep. 13, 2017

(65) Prior Publication Data

US 2018/0079339 A1 Mar. 22, 2018

(30) Foreign Application Priority Data

Sep. 21, 2016 (JP) ................................ 2016-183836

(51) Int. Cl.
*B60N 2/68* (2006.01)

(52) U.S. Cl.
CPC ................... *B60N 2/686* (2013.01)

(58) Field of Classification Search
CPC ........................................................ B60N 2/686
See application file for complete search history.

(56) References Cited

U.S. PATENT DOCUMENTS

| | | | | |
|---|---|---|---|---|
| 4,493,505 A * | 1/1985 | Yamawaki | ........... | B60N 2/3013 296/63 |
| 6,688,700 B2 * | 2/2004 | Gupta | ............... | B29C 49/4802 297/232 |
| 6,739,673 B2 * | 5/2004 | Gupta | ................... | B60N 2/3013 297/232 |
| 6,742,847 B2 * | 6/2004 | Yanai | ................... | B60N 2/3013 297/216.13 |
| 6,981,748 B2 * | 1/2006 | Garnweidner | ....... | B60N 2/5825 297/218.1 |
| 7,422,289 B2 * | 9/2008 | Kim | ...................... | B60N 2/686 297/452.18 |
| 7,891,740 B2 * | 2/2011 | Boes | ...................... | B60N 2/686 297/452.14 |
| 8,789,400 B2 * | 7/2014 | Roszczenko | ............. | B60N 2/22 297/452.18 |

(Continued)

FOREIGN PATENT DOCUMENTS

JP 4146135 6/2008

*Primary Examiner* — Philip F Gabler
(74) *Attorney, Agent, or Firm* — Greenblum & Bernstein, P.L.C.

(57) ABSTRACT

A vehicle seat including a panel frame including a fixed area which is one area of the panel frame partitioned by a line segment connecting a first fixed point and a second fixed point and includes a third fixed point at which the panel frame is fixed to a vehicle main body at a position different from positions of the first and second fixed point, an overhang area which is another area of the panel frame partitioned by the line segment; and a bead including a first and second bead pieces which respectively extend across the overhang area and the fixed area, and one of the first and second bead pieces has an extended portion which extends into an orthogonal area which is an area orthogonal to a portion of the line segment running between the first and second bead pieces.

6 Claims, 4 Drawing Sheets

(56) References Cited

U.S. PATENT DOCUMENTS

| | | | |
|---|---|---|---|
| 8,998,316 B2* | 4/2015 | Naughton | B29C 47/0019 |
| | | | 29/527.1 |
| 9,452,693 B2* | 9/2016 | Gardner | B60N 2/24 |
| 2018/0079339 A1* | 3/2018 | Kimura | B60N 2/686 |
| 2018/0079340 A1* | 3/2018 | Kimura | B60N 2/686 |

* cited by examiner

VEHICLE SEAT

CROSS-REFERENCE TO RELATED APPLICATIONS

This application claims priority from Japanese Patent Application No. 2016-183836 filed on Sep. 21, 2016, the entire contents of which are incorporated herein by reference.

TECHNICAL FIELD

The disclosure relates to a vehicle seat, and particularly, to a vehicle seat that includes a panel frame constituting a framework of a seat back.

BACKGROUND

A rear seat of an automobile is known in which a frame of a seat back includes a panel frame fixedly installed on a partition panel of a vehicle body (Japanese Patent No. 4146135). The panel frame is integrally fixed in such a way that two left and right portions on the lower end side and one central portion on the upper end side are respectively bolted on the partition panel. A bead of a drawn shape for enhancing rigidity against bending and torsion of a panel surface is formed over a wide extension range of the panel surface of the panel frame.

However, in the above related art, when any load acting portion such as an operation lever or a headrest support portion is set in either a left shoulder portion or a right shoulder portion on the upper end side of the panel frame, a load inputted from the load acting portion causes an overload at a position on a line connecting upper and lower fixed points of the panel frame that supports the same load as a cantilever load. Thus, there is a possibility that the panel frame is deformed into a bent shape.

SUMMARY

An object to be achieved by the disclosure is to optimize the shape of the bead of the panel frame.

According to an aspect of the disclosure, there is provided A vehicle seat including: a vehicle main body; and a panel frame forming a framework of a seat back, the panel frame including: a first fixed point at which the panel frame is fixed to the vehicle main body at a first position in a height direction, and a second fixed point at which the panel frame is fixed to the vehicle main body at a second position in the height direction, the second position being different from the first position in the height direction; a fixed area which is one area of the panel frame partitioned by a line segment connecting the first fixed point and the second fixed point and includes a third fixed point at which the panel frame is fixed to the vehicle main body at a position different from positions of the first fixed point and the second fixed point; an overhang area which is another area of the panel frame partitioned by the line segment and overhangs in a cantilevered manner without being fixed to the vehicle main body; a load input point which is in the overhang area and to which a load in an out-of-plane direction is configured to be applied; and a bead having a drawn shape for enhancing surface rigidity of the panel frame, wherein the bead includes a first bead piece and a second bead piece which respectively extend across the overhang area and the fixed area, and one of the first bead piece and the second bead piece has an extended portion which extends into an orthogonal area which is an area orthogonal to a portion of the line segment running between the first bead piece and the second bead piece.

DETAILED DESCRIPTION

Hereinafter, embodiments for carrying out the disclosure will be described with reference to the drawings.

First Embodiment

Figure 1:
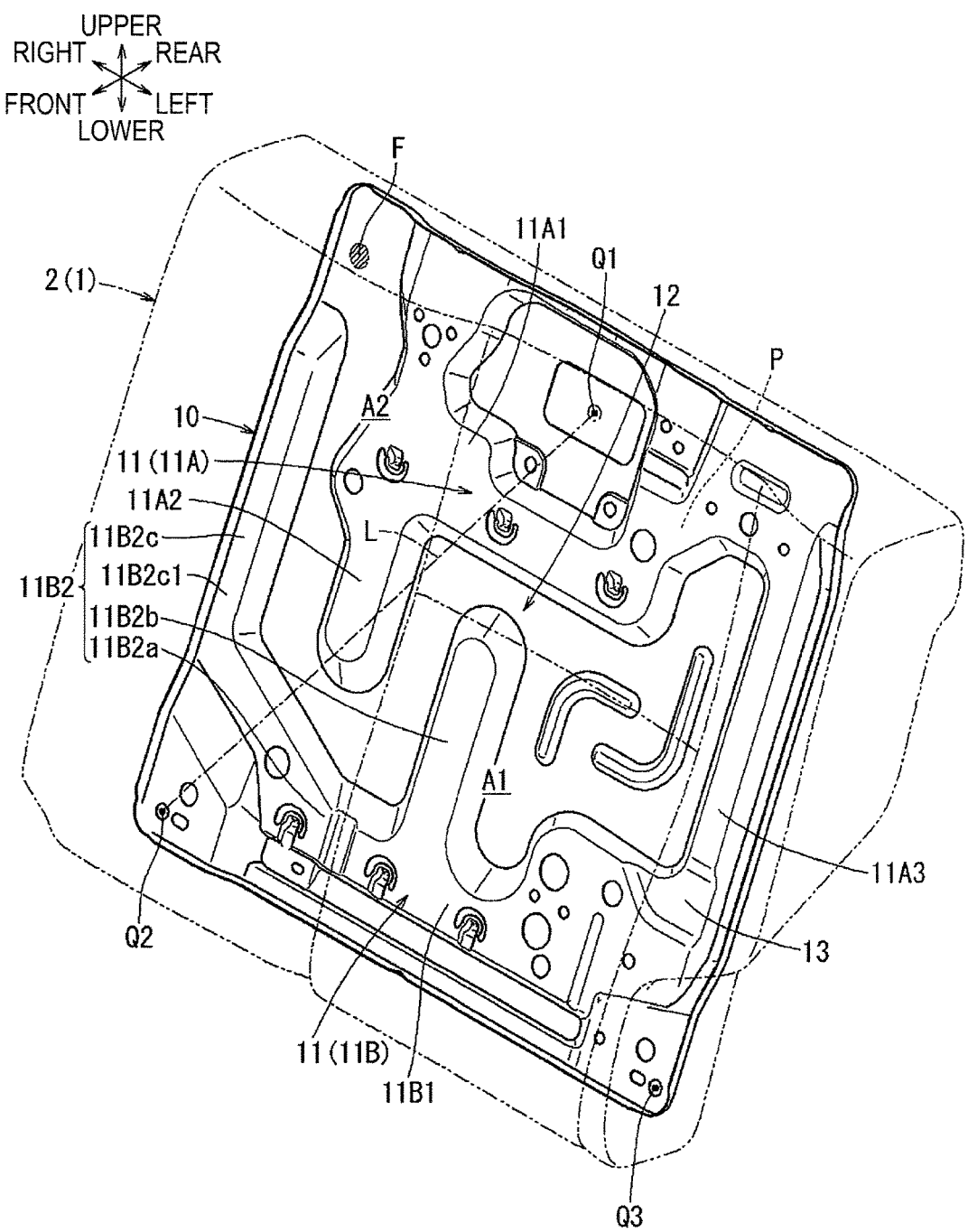
FIG. 1 is a perspective view showing a structure of a main part of a vehicle seat according to a first embodiment.

First, a configuration of a seat 1 (vehicle seat) according to a first embodiment will be described with reference to FIGS. 1 to 4. In the following description, the directions such as a front and rear direction, an upper and lower direction, and a right and left direction refer to the respective directions as indicated in each of the drawings. As shown in FIG. 1, the seat 1 of the present embodiment is configured as a rear seat of an automobile and includes a seat back 2 serving as a backrest of a seated occupant and a seat cushion (not shown) serving as a seating part. The above-described seat 1 is configured as a dividing seat on the wide side of a bench seat on which three persons can sit and which is divided in a ratio of 6:4 in a width direction.

Figure 2:
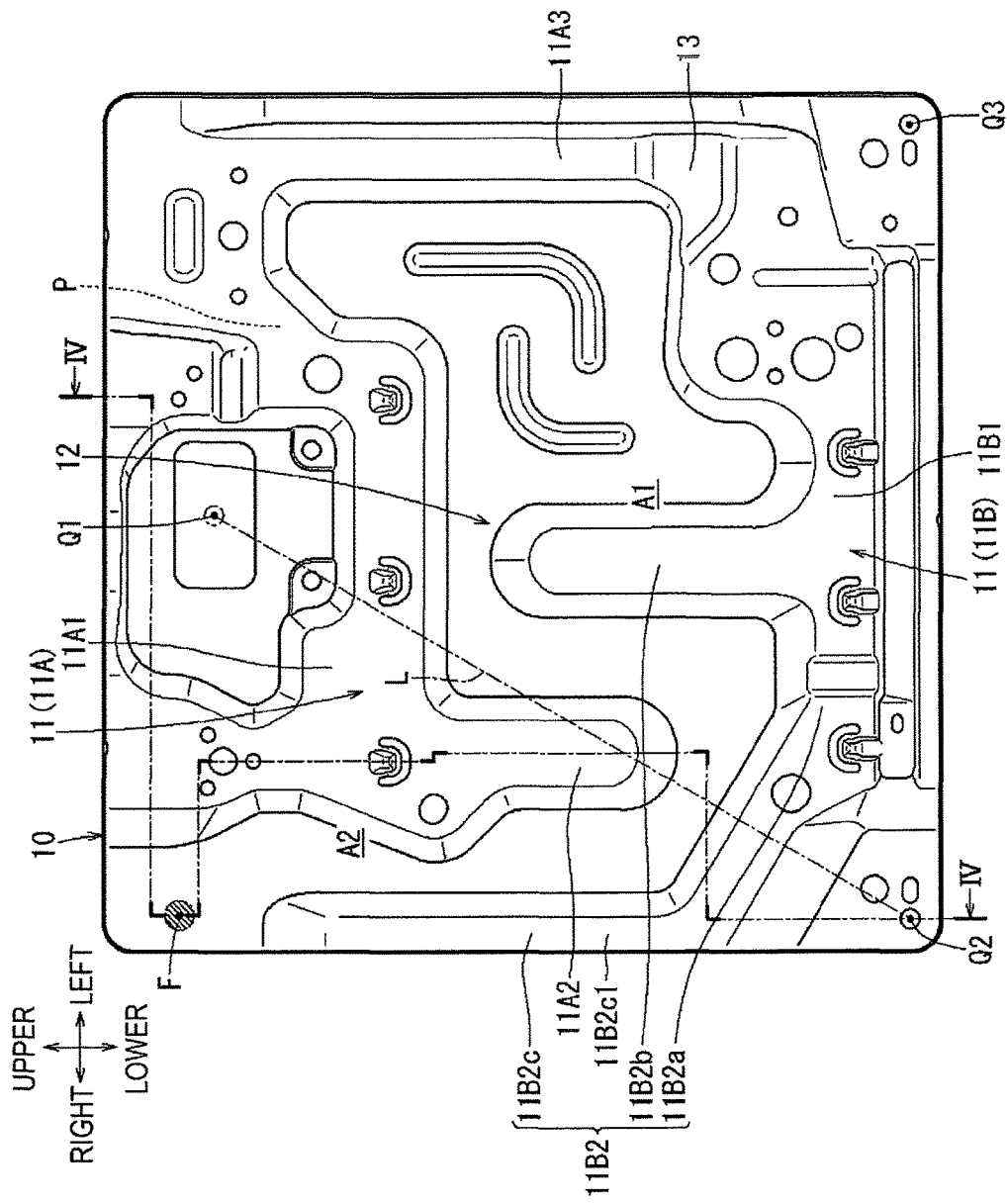
FIG. 2 is a front view of a panel frame.

An internal framework of the seat back 2 of the seat 1 includes a panel frame 10 made of a single metal panel. As shown in FIGS. 1 and 2, the panel frame 10 is set and mounted, from the front, on a partition panel P (specific illustration is omitted) of vehicle body positioned on the back side of the panel frame 10. Specifically, the above-described panel frame 10 is installed as a state in which a substantially central portion (upper fixed point Q1) in the width direction of its upper end-side region and both end portions (lower fixed points Q2, Q3) in the width direction of its lower end-side region are integrally fixed by being respectively bolted on the above-described partition panel P of the vehicle body. Here, the above-described partition panel P corresponds to the "vehicle main body" of the disclosure.

Figure 3:
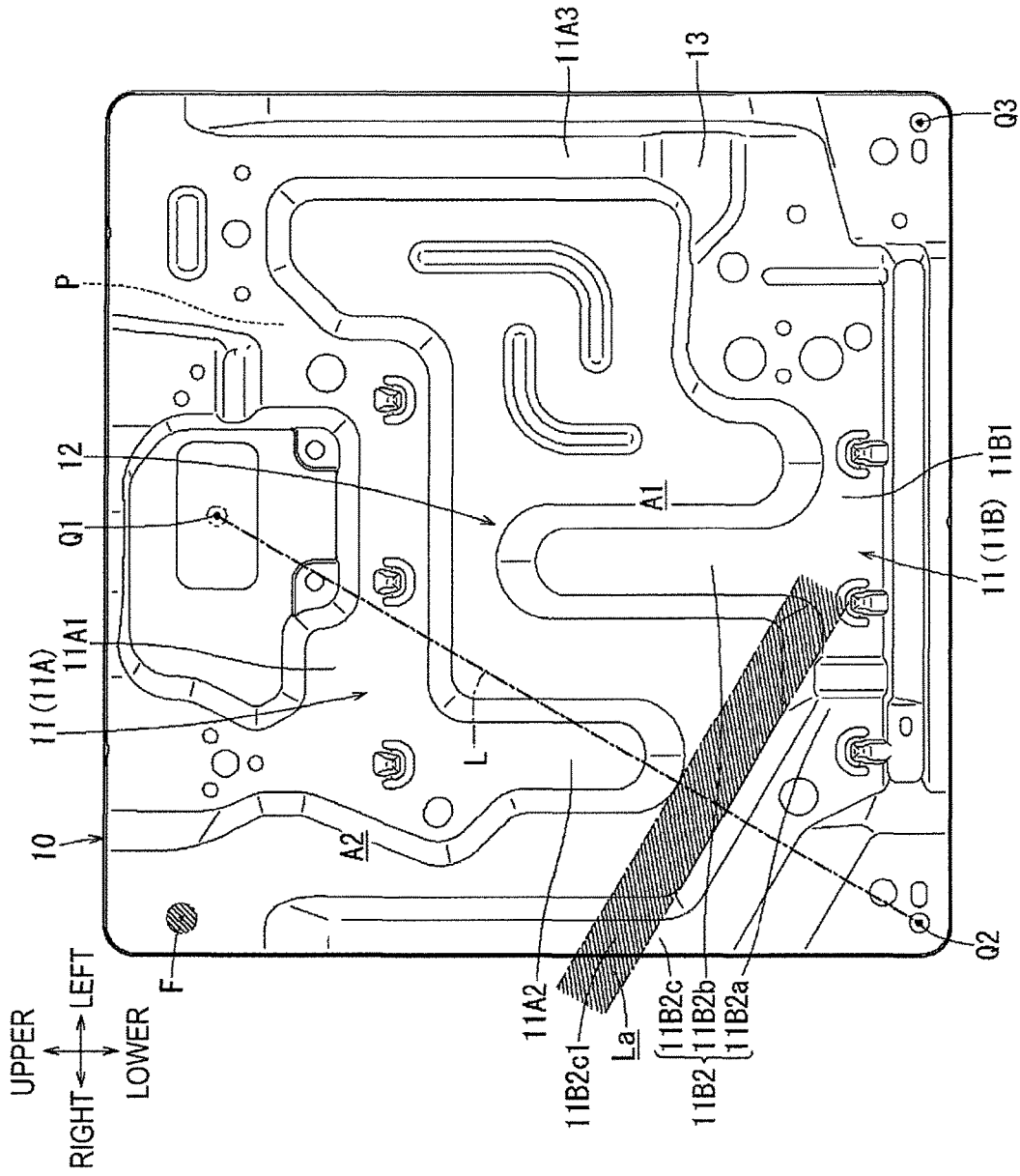
FIG. 3 is a schematic view showing each fixed point and a load input point of the panel frame.
Figure 4:
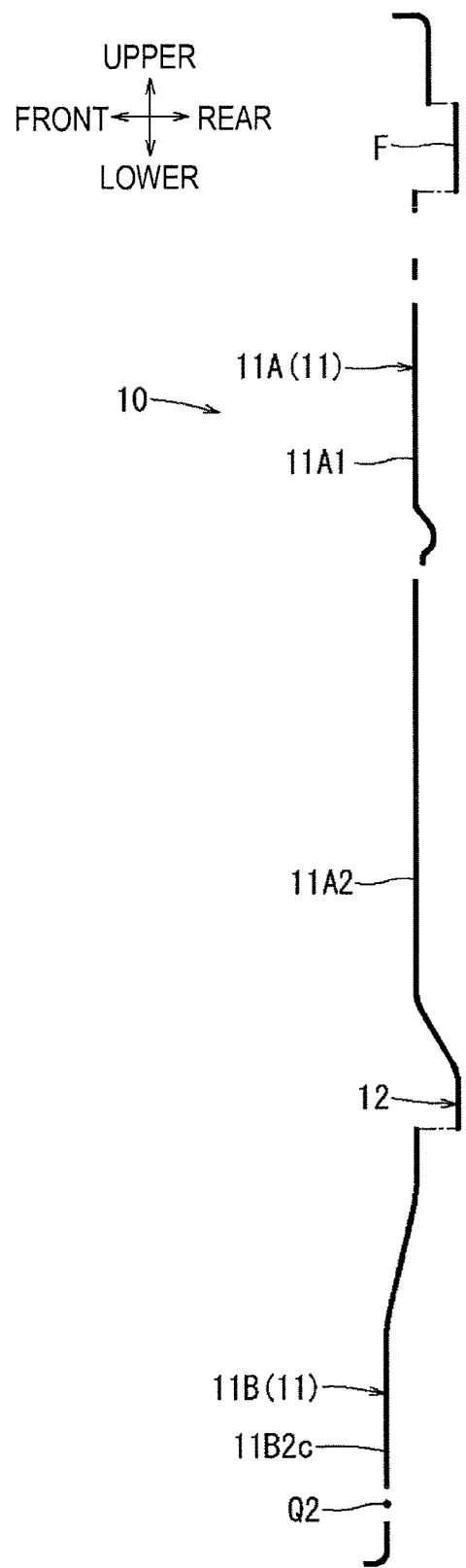
FIG. 4 is a sectional view taken along the line IV-IV shown in FIG. 2.

With the above fixation, the panel frame 10 is installed as a state in which a back pad (not shown) set on the front surface of the panel frame 10 can be widely surface-supported from the back side. For details, as shown in FIG. 3, with the above fixation, a left area of the panel frame 10 partitioned by a line segment L connecting the upper fixed point Q1 and the right lower fixed point Q2 is configured as a fixed area A1 that is fixedly provided in a state of being completely constrained on the partition panel P of the vehicle body by the above-described left lower fixed point Q3. Further, with the above fixation, a right area of the panel frame 10 partitioned by the line segment L is configured as an overhang area A2 that overhangs in a cantilevered manner toward the right upper side without being fixed on the partition panel P of the vehicle body.

Since the overhang area A2 is supported in a cantilevered manner, the overhang area A2 is provided in a state of being likely to be bent in the front and rear direction, as compared with the above-described fixed area A1. Here, the above-described upper fixed point Q1 corresponds to the "first fixed point" of the disclosure, the right lower fixed point Q2 corresponds to the "second fixed point" of the disclosure, and the left lower fixed point Q3 corresponds to "third fixed point" of the disclosure.

A load input point F is set at a right shoulder portion of the panel frame 10 located in the above-described overhang area A2. A load in the front and rear direction (in the out-of-plane direction) may be applied to the load input point F by a force acting on a headrest or any lever (not shown) attached to the shoulder portion. Meanwhile, the position of the load input point F may be set to any position in the overhang area A2, and the position shown in FIG. 3 is just a specific example thereof.

The above-described panel frame 10 is formed in a substantially flat plate shape having a substantially rectangular shape as seen in a front view. However, beads 11 that form a drawn shape for enhancing the surface rigidity (rigidity against bending and torsion) of the panel frame 10 are formed at several portions of the panel frame 10. The above-described beads 11 generally include a first bead piece 11A formed in an upper region of the panel frame 10 and a second bead piece 11B formed in a lower region of the panel frame 10. The first bead piece 11A and the second bead piece 11B are respectively formed so as to be drawn in a shape of bulging forward from a general surface 12 at the same bulging height with respect to the general surface 12 of the panel frame 10 (see FIG. 4).

Specifically, as shown in FIGS. 2 and 3, the above-described first bead piece 11A is formed in a shape of continuously having a body shaped portion 11A1, an entry shaped portion 11A2, and a peripheral shaped portion 11A3. The body shaped portion 11A1 extends downward from a substantially upper edge portion of the panel frame 10 with a wide lateral width over the overhang area A2 that is a right area of the upper fixed point Q1 and the fixed area A1 that is a left area thereof. The entry shaped portion 11A2 extends downward from the right end portion of the body shaped portion 11A1 into the fixed area A1 partially beyond the above-described line segment L. The peripheral shaped portion 11A3 extends partially downward along the left edge of the panel frame 10 from the left end portion of the body shaped portion 11A1. The above-described entry shaped portion 11A2 is shaped so as to extend downward beyond an intermediate area in the width direction without going through the right edge portion of the panel frame 10. Due to the extension to the lower side, the entry shaped portion 11A2 has a shape which is close to the above-described lower fixed point Q2 in the height direction but does not reach a lower edge portion of the panel frame 10.

On the other hand, the second bead piece 11B is formed in a shape of continuously having a body shaped portion 11B1 and a U-shaped portion 11B2. The body shaped portion 11B1 extends upward from a substantially lower edge portion of the panel frame 10 with a wide lateral width over most of the region between the left and right lower fixed points Q2, Q3. The U-shaped portion 11B2 extends upward in a U shape from the right end portion of the body shaped portion 11B1. The left end-side shape portion of the above-described body shaped portion 11B1 extends up to the left edge portion of the panel frame 10 at the position above the respective lower fixed points Q2, Q3 from the substantially lower edge portion of the above-described panel frame 10. Thus, the body shaped portion 11B1 is shaped to be connected to a lower end portion of the peripheral shaped portion 11A3 of the above-described first bead piece 11A by a connection portion 13 of a bead shape which has a bulging height different from (lower than) the lower end portion.

Further, the U-shaped portion 11B2 is formed in a U shape in which a right end-side shape portion of the above-described body shaped portion 11B1 is defined as a bottom side portion 11B2a, and rising side portions 11B2b, 11B2c are respectively extended upward along a substantially central portion in the width direction and a right edge portion of the panel frame 10. Specifically, the U-shaped portion 11B2 is shaped in such a way that the rising side portion 11B2b extending upward along the substantially central portion in the width direction of the panel frame 10 does not extend up to the position where it hits against the body shaped portion 11A1 of the above-described first bead piece 11A in the height direction, and the general surface 12 is formed between the body shaped portion 11A1 and the rising side portion 11B2b. Further, the U-shaped portion 11B2 is shaped in such a way that, from the position of extending rightward and upward obliquely from the right end of the bottom side portion 11B2a and reaching a right edge portion of the panel frame 10, the rising side portion 11B2c extending upward along the right edge portion of the panel frame 10 extends straightly upward along the right edge portion of the panel frame 10.

Due to the extension to the upper side, the right rising side portion 11B2c has a shape which is close to the above-described upper fixed point Q1 in the height direction but does not reach an upper edge portion of the panel frame 10. Then, due to the extension to the upper side, the right rising side portion 11B2c is shaped so as to extend upward from the above-described fixed area A1 into the overhang area A2 beyond the above-described line segment L. The U-shaped portion 11B2 having the above configuration is in a state where the entry shaped portion 11A2 of the above-described first bead piece 11A enters into the U shape of the U-shaped portion 11B2. However, the U-shaped portion 11B2 and the entry shaped portion 11A2 of the first bead piece 11A are shaped in such a way that they do not extend up to the position where they abut against each other, and the general surface 12 is formed therebetween.

As described above, the above-described bead 11 is configured such that the first bead piece 11A and the second bead piece 11B are separately formed to extend from one side and the other side in the height direction over a wide range in an in-plane direction of the panel frame 10. For details, the above-described bead 11 is configured such that the first bead piece 11A and the second bead piece 11B described above appear to extend across the above-described line segment L, respectively. Specifically, the above-described bead 11 is shaped such that the entry shaped portion 11A2 of the above-described first bead piece 11A extends from the above-described overhang area A2 to the fixed area A1 beyond the line segment L, and the right rising side portion 11B2c of the U-shaped portion 11B2 of the second bead piece 11B extends from the above-described fixed area A1 to the overhang area A2 beyond the line segment L. For more details, the rising side portion 11B2c of the U-shaped portion 11B2 of the above-described second bead piece 11B is formed in a shape which has an extended portion 11B2c1 extending in an orthogonal area La which is an area orthogonal to a portion of the line segment L running between the right rising side portion 11B2c and the entry shaped portion 11A2 of the first bead piece 11A.

With the above configuration, in the panel frame 10, the bead 11 that includes the entry shaped portion 11A2 of the first bead piece 11A and the right rising side portion 11B2c of the second bead piece 11B extending over the above-described line segment L suitably suppresses the overhang area A2 from being bent with the line segment L serving as a fulcrum of the cantilever as a bent line due to the load in the front and rear direction (out-of-plane direction) inputted from the load input point F. For details, the second bead piece 11B has the extended portion 11B2c1 in the overhang area A2. Therefore, when the load is inputted as described above, the region between the entry shaped portion 11A2 of the first bead piece 11A and the right rising side portion 11B2c of the second bead piece 11B in the panel frame 10 is also suitably suppressed from being bent in a manner of having a bent line extending along the orthogonal area La of the line segment L. Furthermore, the body shaped portion 11B1 of the second bead piece 11B located within the fixed area A1 is also adapted to extend its shape in the orthogonal area La of the line segment L. Therefore, when the load is inputted, the body shaped portion 11B1 extending into the orthogonal area La can also suitably suppress the panel frame 10 from being bent in a manner of having a bent line extending along the orthogonal area La of the line segment L.

To summarize the above, the seat 1 of the present embodiment is configured as follows. That is, the vehicle seat (seat 1) includes a vehicle main body (partition panel P) and a panel frame (panel frame 10) forming a framework of a seat back (seat back 2). The panel frame (panel frame 10) includes a first fixed point (upper fixed point Q1) at which the panel frame (panel frame 10) is fixed to the vehicle main body (partition panel P) at a first position in a height direction, and a second fixed point (lower fixed point Q2) at which the panel frame (panel frame 10) is fixed to the vehicle main body (partition panel P) at a second position in the height direction, the second position being different from the first position in the height direction, a fixed area (fixed area A1) which is one area of the panel frame (panel frame 10) partitioned by as line segment (line segment L) connecting the first fixed point (upper fixed point Q1) and the second fixed point (lower fixed point Q2) and includes a third fixed point (lower fixed point Q3) at which the panel frame (panel frame 10) is fixed to the vehicle main body (partition panel P) at a position different from positions of the first fixed point (upper fixed point Q1) and the second fixed point (lower fixed point Q2), an overhang area (overhang area A2) which is another area of the panel frame (panel frame 10) partitioned by the line segment (segment L) and overhangs in a cantilevered manner without being fixed to the vehicle main body (partition panel P), a load input point (load input point F) which is in the overhang area (overhang area A2) and to which a load in an out-of-plane direction (front and rear direction) is configured to be applied, and a bead (bead 11) having a drawn shape for enhancing surface rigidity of the panel frame (panel frame 10). The bead (bead 11) includes a first bead piece (first bead piece 11A) and a second bead piece (second bead piece 11B) which respectively extend across the overhang area (overhang area A2) and the fixed area (fixed area A1), and one (second bead piece 11B) of the first bead piece (first bead piece 11A) and the second bead piece (second bead piece 11B) has an extended portion (extended portion 11B2c1 and body shaped portion 11B1) which extends into an orthogonal area (orthogonal area La) which is an area orthogonal to a portion of the line segment (line segment L) running between the first bead piece (first bead piece 11A) and the second bead piece (second bead piece 11B).

With such a configuration, the bead (bead 11) formed to the panel frame (panel frame 10) suitably suppresses the overhang area (overhang area A2) from being bent with the line segment (line segment L) connecting the fixed points (upper fixed point Q1 and lower fixed point Q2) serving as a fulcrum of the cantilever as a bent line due to the load in the out-of-plane direction (front and rear direction) inputted from the load input point (load input point F). For details, one (second bead piece 11B) of the first bead piece (first bead piece 11A) and the second bead piece (second bead piece 11B) has the extended portion (extended portion 11B2c1 and body shaped portion 11B1). Therefore, when the load is inputted as described above, the region between the bead pieces (first bead piece 11A and second bead piece 11B) in the panel frame (panel frame 10) is also suitably suppressed from being bent in a manner of having a bent line extending along the orthogonal area (orthogonal area La) of the line segment (line segment L). In this way, it is possible to optimize the shape of the bead (bead 11) of the panel frame (panel frame 10).

Further, the first bead piece (first bead piece 11A) extends from a position in the overhang area (overhang area A2) that is closer to the first fixed point (upper fixed point Q1) than the second fixed print (lower fixed point Q2) in the height direction to the fixed area (fixed area A1), and the second bead piece (second bead piece 11B) extends from a position in the fixed area (fixed area A1) that is closer to the second fixed point (lower fixed point Q2) than the first fixed point (upper fixed point Q1) in the height direction to the overhang area (overhang area A2). With such a configuration, the bead pieces (first bead piece 11A and second bead piece 11B) can be provided over a wide range in the height direction of the panel frame (panel frame 10), so that the surface rigidity of the panel frame (panel frame 10) can be more appropriately enhanced.

Further, the first bead piece (first bead piece 11A) extends so as to overlap with the first fixed point (upper fixed point Q1) in either of the height direction and a width direction, or the second bead piece (second bead piece 11B) extends so as to overlap with the second fixed point (lower fixed point Q2) in either of the height direction and the width direction. With such a configuration, the bead piece (second bead piece 11B) extending up to the position where it overlaps with the fixed point (lower fixed point Q2) in any one direction (width direction) can be made to exhibit higher surface rigidity, so that the surface rigidity of the panel frame (panel frame 10) can be more appropriately enhanced.

Further, the first fixed point (upper fixed point Q1) is provided in an upper region of the panel frame (panel frame 10), and the second fixed point (lower fixed point Q2) and the third fixed point (lower fixed point Q3) are provided in a lower region of the panel frame (panel frame 10) at different positions in a width direction. The first fixed point (upper fixed point Q1) is located between the second fixed point (lower fixed point Q2) and the third fixed point (lower fixed point Q3) in the width direction, so that the line segment (line segment L) extends obliquely. One (second bead piece 11B) of the first bead piece (first bead piece 11A) and the second bead piece (second bead piece 11B) has a U shape that opens upward from a width direction region between the second fixed point (lower fixed point Q2) and the third fixed point (lower fixed point Q3) in the fixed area (fixed area A1). The other (first bead piece 11A) of the first bead piece (first bead piece 11A) and the second bead piece (second bead piece 11B) extends downward from a width direction region between the first fixed point (upper fixed point Q1) and the load input point (load input point F) in the overhang area (overhang area A2) and enters into the U portion of the U shape.

In this manner, since one bead piece (second bead piece 116B) is formed into the U shape as described above, the rigidity against bending and torsion of itself can be appropriately enhanced. Further, since the other bead piece (first bead piece 11A) has a shape that enters into the U shape, the surface rigidity of the interior of the U shape whose surface rigidity is enhanced by the bead piece (second bead piece 11B) having the U shape can be more appropriately enhanced. Therefore, the surface rigidity of the panel frame (panel frame 10) can be more appropriately enhanced.

Further, the second fixed point (lower fixed point Q2) and the third fixed point (lower fixed point Q3) are respectively provided at both end portions in the width direction of the lower region of the panel frame (panel frame 10), and one (second bead piece 11B) of the first bead piece (first bead piece 11A) and the second bead piece (second bead piece 11B) extending from a width direction region between the both end portions of the lower region to the overhang area (overhang area A2) is provided so as to through an outer peripheral portion of the panel frame (panel frame 10). With such a configuration, even when the lower region of the panel frame (panel frame 10) is fixed at both end portions in the width direction thereof, the surface rigidity of the panel frame (panel frame 10) can be appropriately enhanced by the one bead piece (second bead piece 11B) passing through the outer peripheral portion of the panel frame (panel frame 10).

Further, each of the first bead piece (first bead piece 11A) and the second bead piece (second bead piece 11B) has a shape where an end portion thereof in an extending direction thereof do not extend to an edge portion of the panel frame (panel frame 10). In this way, by forming each of the bead pieces (first bead piece 11A and second bead piece 11B) into the shape as described above, the general surface (general surface 12) without a drawn shape can be set in the remaining end region. Therefore, also in the direction in which the bead pieces (first bead piece 11A and second bead piece 11B) extend, the panel frame (panel frame 10) in which the bead pieces (first bead piece 11A and second bead piece 11B) and the general surface (general surface 12) are aligned can be configured to have higher surface rigidity.

Although the embodiments of the disclosure have been described above using one embodiment, the disclosure can be implemented in various forms other than the above embodiment. For example, the "vehicle seat" of the disclosure can be widely applied not only to a seat other than a rear seat of an automobile, but also to a seat of a vehicle other than an automobile, such as a train, or a seat provided to another vehicle such as an aircraft or a ship.

Further, the first fixed point and the second fixed point for fixing two portions in the height direction of the panel frame to the vehicle main body is not necessarily set at the end portions in the height direction of the panel frame, but may be set at an intermediate portion such as a central portion. Further, the third fixed point which is different from the first fixed point and the second fixed point and is for constituting the fixed area is not necessarily set at a position aligned with one of the first fixed point and the second fixed point in the width direction, but may be set at a height portion between the first fixed point and the second fixed point. Further, the third fixed point may be set at a plurality of portions.

Further, the extended portion extending in the orthogonal area which is an area orthogonal to a portion of the line segment (line segment connecting the fixed points) running between the bead pieces may be formed in each bead piece. The extended portion may extend in a branched manner from an intermediate extension portion of the corresponding bead piece, in addition to extending in a bent manner from an extended tip portion of the corresponding bead piece. The extended portion may be formed in either of the overhang area or the fixed area, or may be formed in each area. Further, in the above embodiment, a configuration has been exemplified in which the panel frame is fixed to the vehicle main body at one upper portion and two lower portions, and thus, the load input point is set in the upper shoulder tip. However, the panel frame may be fixed to the vehicle main body at two upper portions and one lower portion, and thus, the load input point may be formed in the lower end region where the overhang area is formed. The line segment connecting the first fixed point and the second fixed point may be set so as to extend straightly in the height direction.

What is claimed is:
1. A vehicle seat comprising:
a panel frame forming a framework of a seat back, the panel frame including:
a first fixed point at which the panel frame is fixed to a vehicle main body at a first position in a height direction, and a second fixed point at which the panel frame is fixed to the vehicle main body at a second position in the height direction, the second position being different from the first position in the height direction;
a fixed area which is one area of the panel frame partitioned by a line segment extending through the first fixed point and the second fixed point and includes a third fixed point at which the panel frame is fixed to the vehicle main body at a position different from positions of the first fixed point and the second fixed point;
an overhang area which is another area of the panel frame partitioned by the line segment and extends in a cantilevered manner without being fixed to the vehicle main body;
a load input point which is in the overhang area and to which a load in an out-of-plane direction is configured to be applied; and
a bead having a drawn shape for enhancing surface rigidity of the panel frame,
wherein the bead includes a first bead piece and a second bead piece which respectively extend across the overhang area and the fixed area, and one of the first bead piece and the second bead piece has an extended portion which extends into an orthogonal area which is an area orthogonal to a portion of the line segment running between the first bead piece and the second bead piece.
2. The vehicle seat according to claim 1,
wherein the first bead piece extends from a position in the overhang area that is closer to the first fixed point than the second fixed point in the height direction to the fixed area; and the second bead piece extends from a position in the fixed area that is closer to the second fixed point than the first fixed point in the height direction to the overhang area.
3. The vehicle seat according to claim 2,
wherein the first bead piece extends so as to overlap with the first fixed point in either of the height direction and a width direction, or the second bead piece extends so as to overlap with the second fixed point in either of the height direction and the width direction.
4. The vehicle seat according to claim 1,
wherein the first fixed point is provided in an upper region of the panel frame, wherein the second fixed point and the third fixed point are provided in a lower region of the panel frame at different positions in a width direction, wherein the first fixed point is located between the second fixed point and the third fixed point in the width direction, so that the line segment extends obliquely, wherein one of the first bead piece and the second bead piece has a U shape that opens upward from a width direction region between the second fixed point and the third fixed point in the fixed area, and wherein another of the first bead piece and the second bead piece extends downward from a width direction region between the first fixed point and the load input point in the overhang area and enters into the U shape.

5. The vehicle seat according to claim 4, wherein the second fixed point and the third fixed point are respectively provided at both end portions in the width direction of the lower region of the panel frame, and one of the first bead piece and the second bead piece extending from a width direction region between the both end portions of the lower region to the overhang area is provided so as to pass through an outer peripheral portion of the panel frame.

6. The vehicle seat according to claim 1, wherein each of the first bead piece and the second bead piece has a shape where an end portion thereof in an extending direction thereof do not extend to an edge portion of the panel frame.

\* \* \* \* \*